United States Patent
Caples

(10) Patent No.: US 10,059,386 B1
(45) Date of Patent: Aug. 28, 2018

(54) AIR DEFLECTOR FOR CONVERTIBLE AUTOMOTIVE VEHICLE

(71) Applicant: GM GLOBAL TECHNOLOGY OPERATIONS LLC, Detroit, MI (US)

(72) Inventor: David C. Caples, Huntington Woods, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 15/637,021

(22) Filed: Jun. 29, 2017

(51) Int. Cl.
| | |
|---|---|
| *B62D 37/02* | (2006.01) |
| *B62D 35/00* | (2006.01) |
| *B60J 7/12* | (2006.01) |
| *B60J 7/22* | (2006.01) |

(52) U.S. Cl.
CPC ............. *B62D 37/02* (2013.01); *B60J 7/12* (2013.01); *B60J 7/223* (2013.01); *B62D 35/005* (2013.01)

(58) Field of Classification Search
CPC .......... B62D 37/02; B62D 35/005; B60J 7/12; B60J 7/223
USPC .................................. 296/180.1, 180.5, 217
See application file for complete search history.

(56) References Cited

U.S. PATENT DOCUMENTS

| | | | |
|---|---|---|---|
| 5,558,388 A * | 9/1996 | Furst | B60J 1/1823 296/107.18 |
| 6,416,120 B1 * | 7/2002 | Schutt | B60J 7/22 296/217 |
| 2015/0102634 A1 * | 4/2015 | Bauer | B60J 7/223 296/180.1 |

* cited by examiner

*Primary Examiner* — Joseph D. Pape

(57) ABSTRACT

An automotive vehicle includes a body having an occupant compartment. The vehicle additionally includes a windshield frame coupled to the body and disposed at a fore portion of the occupant compartment. The windshield frame has an upper periphery. The vehicle also includes a roof disposed to selectively cover the occupant compartment. The roof has an extended position in which the roof covers the occupant compartment and a retracted position in which the roof does not cover the occupant compartment. The vehicle further includes an airfoil coupled to the windshield frame by a linkage. The linkage has a stowed position and a deployed position. In the deployed position the airfoil projects above the upper periphery of the windshield frame with a gap therebetween. In the stowed position the airfoil does not project above the upper periphery of the windshield.

14 Claims, 2 Drawing Sheets

AIR DEFLECTOR FOR CONVERTIBLE AUTOMOTIVE VEHICLE

TECHNICAL FIELD

The present disclosure relates to automotive vehicles, and more particularly to aerodynamic features of automotive vehicles.

INTRODUCTION

Automotive vehicles are generally provided with cabins within which occupants may ride. Some automotive vehicles, generally referred to as convertibles, may be converted between an enclosed-cabin mode and an open-air mode. A convertible vehicle may have a retractable fabric roof, a retractable hardtop roof, a detachable hardtop roof, or other arrangement by which a roof above the cabin may be retracted or removed.

SUMMARY

An automotive vehicle according to the present disclosure includes a body having an occupant compartment. The vehicle additionally includes a windshield frame coupled to the body and disposed at a fore portion of the occupant compartment. The windshield frame has an upper periphery. The vehicle also includes a roof disposed to selectively cover the occupant compartment. The roof has an extended position in which the roof covers the occupant compartment and a retracted position in which the roof does not cover the occupant compartment. The vehicle further includes an airfoil coupled to the windshield frame by a linkage. The linkage has a stowed position and a deployed position. In the deployed position the airfoil projects above the upper periphery of the windshield frame with a gap therebetween. In the stowed position the airfoil does not project above the upper periphery of the windshield.

In an exemplary embodiment, the vehicle additionally includes a biasing member coupled to the linkage and configured to bias the linkage toward the deployed position.

In an exemplary embodiment, the vehicle additionally includes a motor and a controller. The motor is coupled to the linkage and configured to drive the linkage between the stowed position and the deployed position. The controller is configured to, in response to an operating condition being satisfied, control the motor to drive the linkage from the stowed position to the deployed position. According to various embodiments, the operating condition may include the roof being moved from the extended position to the retracted position, a vehicle performance mode being active, or a current vehicle speed exceeding a predefined threshold.

In an exemplary embodiment, the airfoil has a pressure surface and a suction surface, and the suction surface is disposed on an upper side of the airfoil.

An assembly for an automotive vehicle according to the present disclosure includes a windshield frame for retaining a windshield. The windshield frame has an upper periphery. The assembly additionally includes an airfoil disposed proximate the upper periphery of the windshield frame. The assembly further includes a linkage coupling the airfoil to the windshield frame. The linkage has a stowed position and a deployed position. In the stowed position the airfoil abuts the upper periphery of the windshield frame, and in the deployed position the airfoil is spaced from the upper periphery of the windshield frame with an air gap therebetween.

In an exemplary embodiment, the assembly additionally includes a biasing member coupled to the linkage and configured to bias the linkage toward the deployed position. Such embodiments may also include a roof with an enclosed-cabin position and an open-air position. In the enclosed-cabin position the roof retains the linkage in the stowed position, and in the open-air position the roof does not retain the linkage in the stowed position.

In an exemplary embodiment, the assembly additionally includes a motor and a controller. The motor is coupled to the linkage and configured to drive the linkage between the stowed position and the deployed position. The controller is configured to, in response to an operating condition being satisfied, control the motor to drive the linkage from the stowed position to the deployed position. According to various embodiments, the operating condition may include the roof being moved from the extended position to the retracted position, a vehicle performance mode being active, or a current vehicle speed exceeding a predefined threshold.

In an exemplary embodiment, the airfoil has a pressure surface and a suction surface, and the suction surface is disposed on an upper side of the airfoil.

Embodiments according to the present disclosure provide a number of advantages. For example, the present disclosure provides a system for reducing drag and improving handling on a convertible vehicle in open-air mode.

The above and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desirable for particular applications or implementations.

Automotive vehicles are generally provided with cabins within which occupants may ride. Some automotive vehicles, generally referred to as convertibles, may be converted between an enclosed-cabin mode and an open-air mode. A convertible vehicles may have a retractable fabric roof, a retractable hardtop roof, a detachable hardtop roof, or other arrangement by which a roof above the cabin may be retracted or removed.

As an automotive vehicle travels, it disturbs the air through which it passes. Typical vehicle aerodynamic design attempts to maintain reasonably attached flow along the length of the car until the trailing edge of the vehicle. If the boundary layer separates before the trailing edge, the reduction in pressure may cause adverse effects to drag and lift. Moreover, the exterior of a vehicle is generally designed to position the aerodynamic center of pressure in an advantageous position relative to the center of gravity thereby providing a desirable aerodynamic balance, e.g. a desirable downforce balance between front and rear wheels. For convertible vehicles, the exterior is generally optimized for enclosed-cabin driving.

Figure 1:
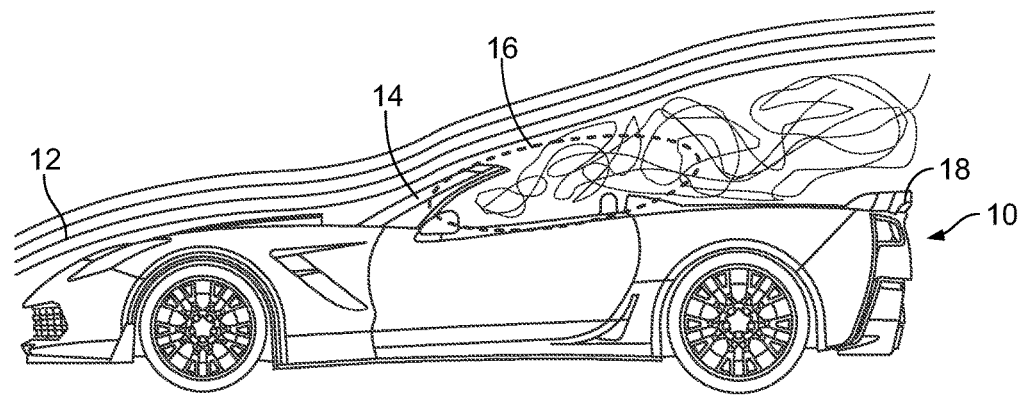
FIG. 1 illustrates airflow about a prior art convertible automotive vehicle.

Referring now to FIG. 1, streaklines 12 about a prior art convertible vehicle 10 in open-air mode are illustrated. As the convertible vehicle 10 travels at speed in open-air mode, air separates from the vehicle 10 as it passes over a vehicle windshield 14, thereby forming a wake region 16. The wake region 16 may adversely impact aerodynamic performance of the vehicle 10 in a variety of ways relative to enclosed-cabin mode. For example, the wake region 16 results in decreased pressure at the aft of the vehicle 10, may inhibit functioning of an aft spoiler 18 or similar device, and may increase drag on the vehicle 10. As a result, when the vehicle 10 is in open-air mode, the aerodynamic balance between front and rear wheels may differ from when in enclosed-cabin mode.

Figure 2:
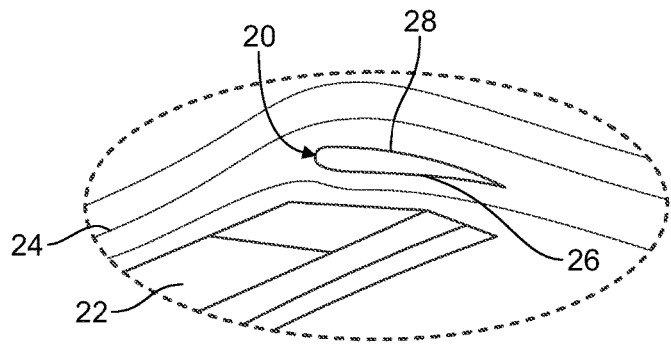
FIG. 2 illustrates airflow about an airfoil assembly according to the present disclosure.

Referring now to FIG. 2, an assembly according to the present disclosure is illustrated schematically. An airfoil 20 is provided at an upper portion of a windshield 22 of a convertible vehicle. The airfoil 20 comprises an elongate span with a cross-section shaped to provide desirable aerodynamic properties. As illustrated by the streaklines 24, the airfoil 20 is configured to redirect air flow toward the body of the vehicle. In the exemplary embodiment shown in FIG. 2, the airfoil has a pressure surface 26 on a bottom side, i.e. oriented toward the windshield 22, and a suction surface 28 on an upper side, i.e. oriented away from the windshield 22.

Figure 3:
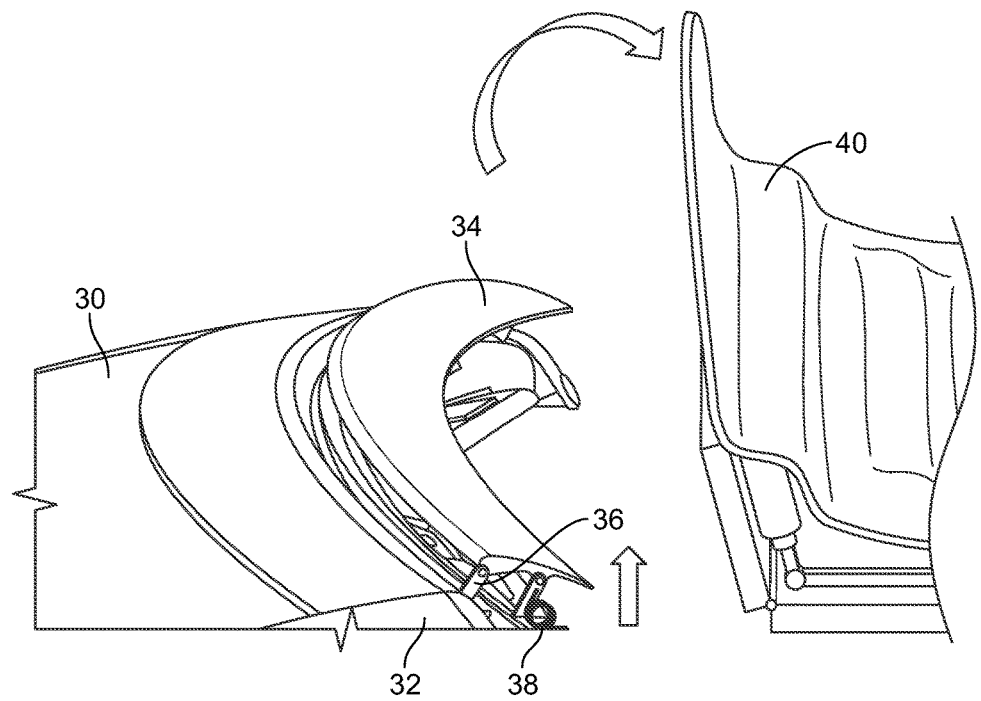
FIG. 3 illustrates a first embodiment of an airfoil assembly according to the present disclosure.

Referring now to FIG. 3, an exemplary embodiment of an airfoil assembly according to the present disclosure is illustrated. A vehicle windshield 30 is disposed in a windshield frame 32. An airfoil 34 is coupled to the frame 32 by a linkage 36. The linkage 36 has a stowed position, in which the airfoil 34 is retained against an upper portion of the windshield 30, e.g. abutting and generally flush with the frame 32. The linkage 36 also has a deployed position, illustrated in FIG. 3, in which the airfoil 34 is displaced away from and above the upper portion of the windshield 30 with a gap therebetween. In the deployed position, the airfoil 34 may be spaced from the windshield 30 in generally the same relationship as illustrated in FIG. 2.

In the embodiment illustrated in FIG. 3, the linkage 36 includes a first four-bar linkage at a first end of the airfoil 34 and a second four-bar linkage at a second end of the airfoil 34. However, in other embodiments, other linkage arrangements may be implemented as appropriate.

A biasing member 38 is coupled to the linkage 36 and arranged to bias the linkage 36 toward the deployed position. In this embodiment the biasing member 38 is depicted as a torsion spring; however, in other embodiments, other spring arrangements or other types of biasing members may be used.

A retractable or removable roof 40 is disposed proximate the upper portion of the windshield 30. While depicted here as a retractable convertible roof, the roof 40 may in other embodiments be detachable roof. The roof 40 has a fore edge disposed proximate an aft edge of the airfoil 34. When in the enclosed-cabin mode, the fore edge of the roof 40 abuts the aft edge of the airfoil 34 and secures the linkage 36 in the stowed position. When in the open-air mode, e.g. by retraction of the roof as illustrated in FIG. 3, the biasing member 38 drives the linkage 36 to the deployed position. Likewise, when moved back to the enclosed-cabin mode, the fore edge of the roof 40 contacts the aft edge of the airfoil 34, overcomes the force of the biasing member 38, and drives the linkage 36 back to the stowed position.

Figure 4:
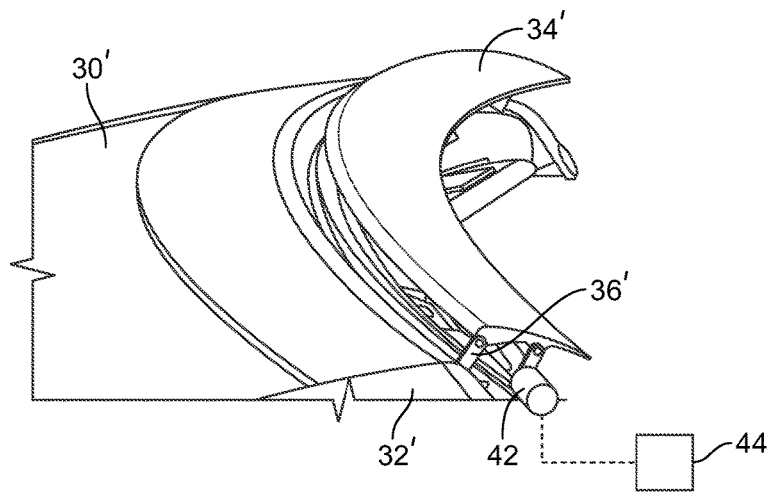
FIG. 4 illustrates a second embodiment of an airfoil assembly according to the present disclosure.

Referring now to FIG. 4, an alternative embodiment of an airfoil assembly according to the present disclosure is illustrated. A vehicle windshield 30' is disposed in a windshield frame 32'. An airfoil 34' is coupled to the frame 32' by a linkage 36'. The linkage 36' has a stowed position, in which the airfoil 34' is retained against an upper portion of the windshield 30', e.g. abutting and generally flush with the frame 32'. The linkage 36' also has a deployed position, illustrated in FIG. 4, in which the airfoil 34' is displaced away from and above the upper portion of the windshield 30' with a gap therebetween. In the deployed position, the airfoil 34' may be spaced from the windshield 30' in generally the same relationship as illustrated in FIG. 2.

An actuator 42, e.g. a motor, is coupled to the linkage 36'. The actuator 42 is under the control of a controller 44 and configured to drive the linkage 36' between the stowed position and the deployed position in response to commands from the controller 44.

In an exemplary embodiment, the controller 44 is programmed to control the actuator 42 to drive the linkage 36' from the stowed position to the deployed position in response to the vehicle being converted from the enclosed-cabin mode to the open-air mode.

In another embodiment, the controller 44 is programmed to control the actuator 42 to drive the linkage 36' from the stowed position to the deployed position in response to satisfaction of an operating condition. The operating condition may include, for example, a vehicle speed exceeding a predefined threshold. As another example, the vehicle may be controllable according to a plurality of operating modes such as a performance mode or an economy mode, and the operating condition includes the performance mode being active.

In another embodiment, a vehicle operator may selectively deploy the airfoil 34' via a command at a user interface. In response to a command from an operator, the controller 44 may control the actuator 42 to drive the linkage 36' from the stowed position to the deployed position or from the deployed position to the stowed position.

The controller 44 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

In other embodiments according to the present disclosure, other airfoil configurations may be used. For example, other embodiments may utilize other types of linkages having deployed and stowed positions, or may implement a statically-mounted airfoil.

Figure 5:
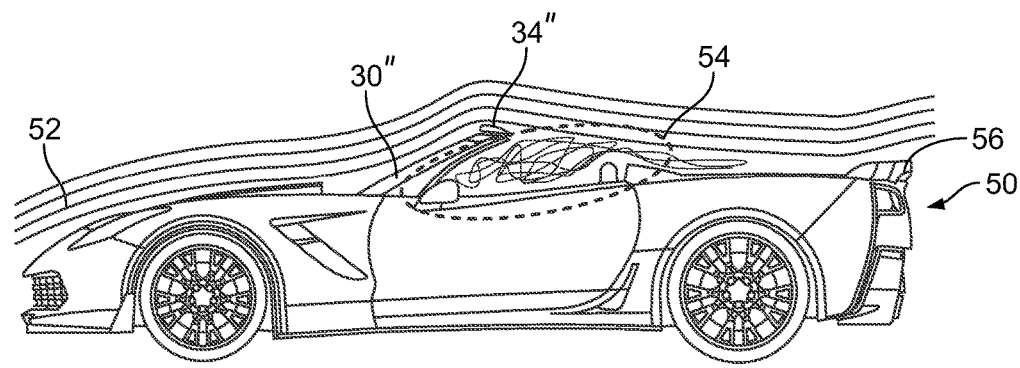
FIG. 5 illustrates airflow about an automotive vehicle according to the present disclosure.

Referring now to FIG. 5, streaklines 52 about a convertible vehicle 50 in open-air mode according to the present disclosure are illustrated. An airfoil 34" is disposed at an upper portion of a windshield 30" of the vehicle 50. As the vehicle 5 travels at speed in open-air mode, the airfoil 34" directs air back toward the body of the vehicle 50, thereby forming a turbulent wake region 54 of reduced size relative to that of known vehicles, e.g. the region 16 illustrated in FIG. 1. As a result, various aspects of the aerodynamic performance of the vehicle 50 are improved relative to known vehicles, resulting in more consistent performance between open-air and enclosed-cabin modes. For example, the aft spoiler 56 of the vehicle 50 may perform more consistently due to increased air flow, drag may be reduced due to the smaller wake region, and overall aerodynamic balance may be improved.

As may be seen, the present disclosure provides a system for reducing drag and improving handling on a convertible vehicle in open-air mode.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:
a body having an occupant compartment;
a windshield frame coupled to the body and disposed at a fore portion of the occupant compartment, the windshield frame having an upper periphery;
a roof disposed to selectively cover the occupant compartment, the roof having an extended position in which the roof covers the occupant compartment and a retracted position in which the roof does not cover the occupant compartment; and
an airfoil coupled to the windshield frame by a linkage, the linkage having a stowed position and a deployed position, wherein in the deployed position the airfoil projects above the upper periphery of the windshield frame and in the stowed position the airfoil does not project above the upper periphery of the windshield frame, wherein the airfoil has a pressure surface and a suction surface, the suction surface being disposed on an upper side of the airfoil, and wherein in the deployed position the pressure surface is disposed above upper periphery of the windshield frame with a gap therebetween.

2. The vehicle of claim 1, further comprising a biasing member coupled to the linkage and configured to bias the linkage toward the deployed position.

3. The vehicle of claim 1, further comprising:
a motor coupled to the linkage and configured to drive the linkage between the stowed position and the deployed position; and
a controller configured to, in response to an operating condition being satisfied, control the motor to drive the linkage from the stowed position to the deployed position.

4. The vehicle of claim 3, wherein the operating condition includes the roof being moved from the extended position to the retracted position.

5. The vehicle of claim 3, wherein the operating condition includes a current vehicle speed exceeding a predefined threshold.

6. The vehicle of claim 3, wherein the operating condition includes a vehicle performance mode being active.

7. An assembly for an automotive vehicle comprising:
a windshield frame for retaining a windshield, the windshield frame having an upper periphery;
an airfoil disposed proximate the upper periphery of the windshield frame; and
a linkage coupling the airfoil to the windshield frame, the linkage having a stowed position and a deployed position, wherein in the stowed position the airfoil abuts the upper periphery of the windshield frame, and in the deployed position the airfoil is spaced from the upper periphery of the windshield frame with an air gap therebetween, and wherein the airfoil has a pressure surface and a suction surface, the suction surface being disposed on an upper side of the airfoil.

8. The assembly of claim 7, further comprising a biasing member coupled to the linkage and configured to bias the linkage toward the deployed position.

9. The assembly of claim 8, further comprising a roof having an enclosed-cabin position and an open-air position, wherein in the enclosed-cabin position the roof retains the linkage in the stowed position, and in the open-air position the roof does not retain the linkage in the stowed position.

10. The assembly of claim 7, further comprising:
a motor coupled to the linkage and configured to drive the linkage between the stowed position and the deployed position; and
a controller configured to, in response to an operating condition being satisfied, control the motor to drive the linkage from the stowed position to the deployed position.

11. The assembly of claim 10, wherein the operating condition includes the roof being moved from the extended position to the retracted position.

12. The assembly of claim 10, wherein the operating condition includes a current vehicle speed exceeding a predefined threshold.

13. The assembly of claim 10, wherein the operating condition includes a vehicle performance mode being active.

14. The vehicle of claim 1, wherein the airfoil extends from a fore portion to an aft portion, the fore portion being disposed above the upper periphery of the windshield frame.

\* \* \* \* \*